United States Patent [19]

Lin

[11] Patent Number: 5,253,305
[45] Date of Patent: Oct. 12, 1993

[54] CHARACTER BOUNDARY IDENTIFICATION METHOD AND SYSTEM

[75] Inventor: Yeong-Shuenn Lin, Hsinchu, Taiwan

[73] Assignee: Industrial Technology Research Institute, Chutung Hsinchu, Taiwan

[21] Appl. No.: 720,235

[22] Filed: Jun. 25, 1991

[51] Int. Cl.$^5$ .............................................. G06K 9/00
[52] U.S. Cl. .......................................... 382/9; 382/16
[58] Field of Search ................... 382/9, 10, 16, 19, 25, 382/28

[56] References Cited

U.S. PATENT DOCUMENTS

| | | | |
|---|---|---|---|
| 4,527,283 | 7/1985 | Ito et al. | 382/9 |
| 4,899,394 | 2/1990 | Lee | 382/9 |
| 4,903,311 | 2/1990 | Nakamura | 382/18 |
| 4,926,490 | 5/1990 | Mano | 382/9 |
| 4,959,868 | 9/1990 | Tanioka | 382/9 |
| 5,033,097 | 7/1991 | Nakamura | 382/9 |
| 5,054,091 | 10/1991 | Tanaka et al. | 382/9 |
| 5,075,895 | 12/1991 | Bessho | 382/9 |

OTHER PUBLICATIONS

F. M. Wail, et al, "Block Segmentation and Text Extraction in Mixed Text/Image Documents", Computer Graphics & Image Proc. 20, 375-390 (1982).

N. H. Yeh et al, "Character Recognitin by 1 Board OCR", Proc. of Int'l Computer Symp., Dec. 17-19, Tainan, Taiwan, ROC.

Primary Examiner—Michael T. Razavi
Assistant Examiner—Yon Jung
Attorney, Agent, or Firm—Marmorek, Guttman & Rubenstein

[57] ABSTRACT

An optical recognition method and system utilizes a scanner to digitize a complex document comprising regions of text and graphics. A recognition engine, illustratively in the form of a general purpose computer, separates regions of text and graphics and identifies lines of text. Character boundaries are determined in each line of text by forming a shadow of the line of text on the horizontal axis. Each byte from the shadow is utilized to access a table stored in a memory associated with the recognition engine. The value contained in the table provides information as to where boundaries are located in the portion of the line of text corresponding to the byte from the shadow.

4 Claims, 7 Drawing Sheets

FIG. 8
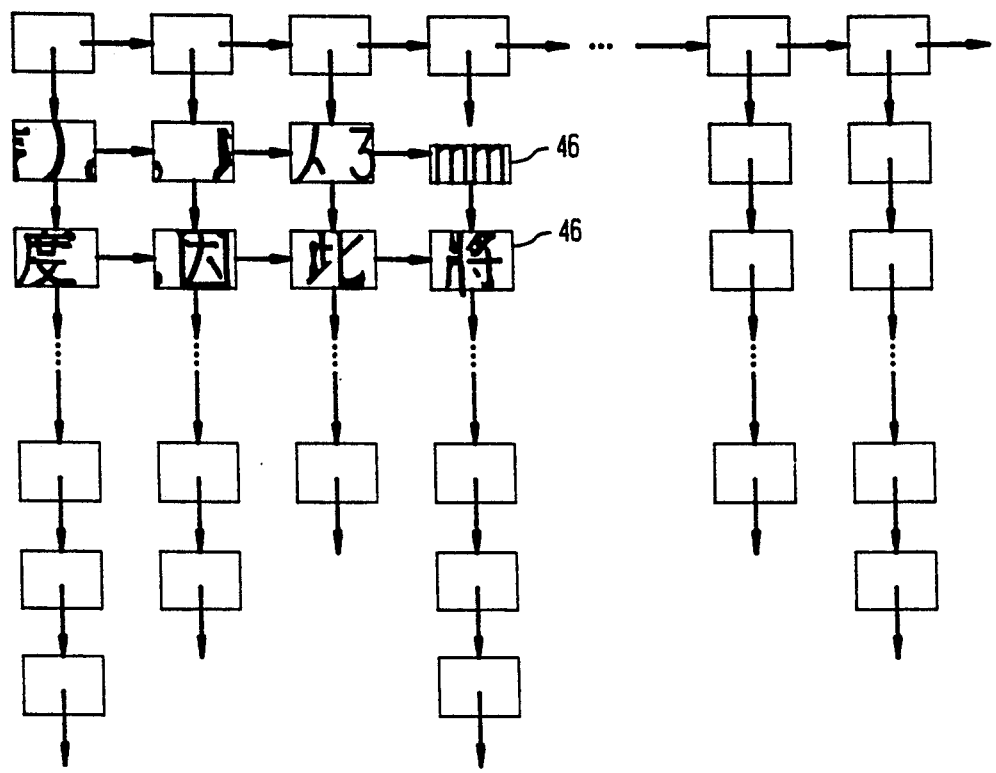
FIG. 10A
FIG. 10
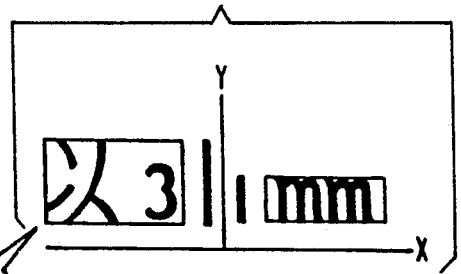

FIG. 11

```
TABLE[] = {
    0x00, 0x67, 0x00, 0x66, 0x00, 0x67, 0x00, 0x65, 0x00, 0x67,
    0x00, 0x66, 0x00, 0x67, 0xa6, 0x64, 0x00, 0x67, 0x00, 0x66,
    0x00, 0x67, 0x00, 0x65, 0x00, 0x67, 0x00, 0x66, 0x9d, 0x3a,
    0x9e, 0x63, 0x00, 0x67, 0x00, 0x66, 0x00, 0x67, 0x00, 0x65,
    0x00, 0x67, 0x00, 0x66, 0x00, 0x67, 0xa6, 0x64, 0x00, 0x67,
    0x00, 0x66, 0x00, 0x67, 0x00, 0x65, 0x94, 0x39, 0x8c, 0x38,
    0x95, 0x37, 0x96, 0x62, 0x00, 0x67, 0x00, 0x66, 0x00, 0x67,
    0x00, 0x65, 0x00, 0x67, 0x00, 0x66, 0x00, 0x67, 0xa6, 0x64,
    0x00, 0x67, 0x00, 0x66, 0x00, 0x67, 0x00, 0x65, 0x00, 0x67,
    0x00, 0x63, 0x9d, 0x39, 0x9e, 0x63, 0x00, 0x67, 0x00, 0x66,
    0x00, 0x67, 0x00, 0x65, 0x00, 0x67, 0x00, 0x66, 0x00, 0x67,
    0x8d, 0x64, 0x8b, 0x34, 0x8b, 0x36, 0x8b, 0x34, 0x8b, 0x35,
    0x8c, 0x33, 0x8c, 0x32, 0x8d, 0x31, 0x8e, 0x61, 0x40, 0xc7,
    0x40, 0xc6, 0x40, 0xc7, 0x40, 0xc5, 0x40, 0xc7, 0x40, 0xc6,
    0x40, 0xc7, 0x21, 0xc4, 0x40, 0xc7, 0x40, 0xc6, 0x40, 0xc7,
    0x40, 0xc5, 0x40, 0xc7, 0x40, 0xc6, 0x22, 0x17, 0x23, 0xc3,
    0x40, 0xc7, 0x40, 0xc6, 0x40, 0xc7, 0x40, 0xc5, 0x40, 0xc7,
    0x40, 0xc6, 0x40, 0xc7, 0x21, 0xc4, 0x40, 0xc7, 0xc7, 0xc6,
    0x40, 0x40, 0x24, 0xc5, 0x26, 0x11, 0x25, 0x10, 0x26, 0x13,
    0x21, 0xc2, 0x41, 0xcf, 0x41, 0xce, 0x41, 0xcf, 0x41, 0xcd,
    0x41, 0xcf, 0x41, 0xce, 0x41, 0xcf, 0x27, 0xcc, 0x41, 0xcf,
    0x41, 0xce, 0x41, 0xcf, 0x41, 0xcd, 0x41, 0xcf, 0x41, 0xce,
    0x28, 0x1f, 0x29, 0xcb, 0x42, 0xd7, 0x42, 0xd6, 0x42, 0xd7,
    0x42, 0xd5, 0x42, 0xd7, 0x42, 0xd6, 0x42, 0xd7, 0x46, 0xd4,
    0x43, 0xdf, 0x43, 0xde, 0x43, 0xdf, 0x43, 0xdd, 0x44, 0xe7,
    0x44, 0xe6, 0x45, 0xef, 0x46, 0x01 };
```

FIG. 12

```
SPECIAL_TAB[] = {
    0,    0x12, 0x09, 0x0a, 0x02, 0x00, 0x01, 0x52, 0x49, 0x4a,
    0x92, 0x00, };
```

FIG. 13
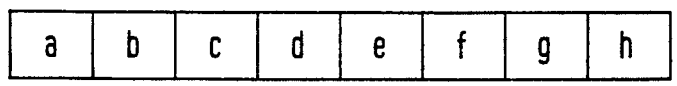
FIG. 14
<1> a = 0, b = 0, h = 0 ⇒ 00
                   h = 1 ⇒ FF
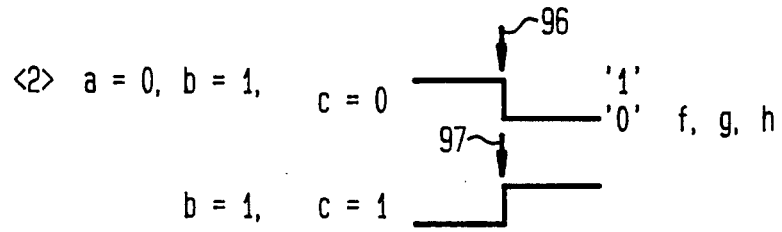
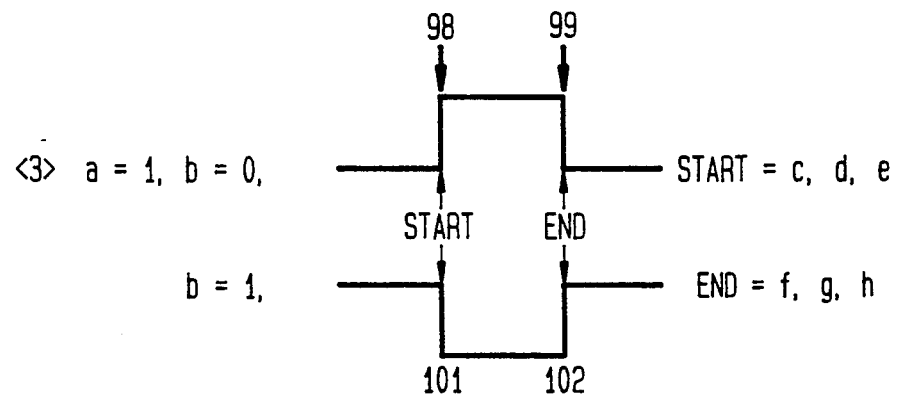
<4> a = 0, b = 0, cd = 10, 
   a = 0, b = 0, cd = 11, 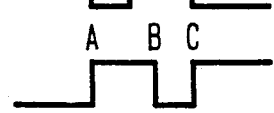
   a = 0, b = 0, cd = 01, 

CHARACTER BOUNDARY IDENTIFICATION METHOD AND SYSTEM

RELATED APPLICATION

An application entitled "Method And System For Identifying Lines of Text in a Document" has been filed for Jar Long Wang on even date herewith, bears Ser. No 07/720,236 now pending and is assigned to the assignee hereof. This application contains subject matter related to that of the present application.

FIELD OF THE INVENTION

The present invention relates to an image processing method and system for extracting characters, such as Roman or Chinese characters, from a digitized image. The present invention relates to a method and system for processing digital images of complex documents including regions of text and graphics to separate the text regions from the graphics regions and to identify the lines of text in the text regions. In particular, the present invention relates to identifying character boundaries in a line of text.

BACKGROUND OF THE INVENTION

In a typical optical recognition system, a document, including text and graphics, is processed by a scanner to form a digital representation of the document. Illustratively, the digital image is bitonal with a logic "1" representing pixels which are black and a logic "0" representing pixels which are white. The digital image is then processed by a recognition engine. The recognition engine converts the digitized image into symbolic information about the contents of the image. This symbolic information is then stored in a memory. The recognition engine may be implemented using specially dedicated electronic circuitry or through use of a programmable machine such as a general purpose computer.

One function of the recognition engine is to recognize the characters contained in the digital image so that these characters can be converted to symbolic form. Before the characters can be recognized, it is usually desirable to separate the graphical and text regions of a digital image, to identify lines of text within the text regions, and to locate character boundaries within the lines of text. A variety of techniques have previously been used to carry out this character extraction process including 1) histogram techniques, 2) expansion and shrinking techniques (see, e.g., O. Nakamora et al, "A Character Segmentation Algorithm for Mixed Mode Communication" and T. Akiyama et al, "A Method of Character Extraction From Horizontally/Vertically Printed Document images"), 3) the constraint run length method (see, e.g., F.M. Wahl, et al, "Block Segmentation and Text Extraction in Mixed Text/Image Documents", Computer Graphics and Image Processing, 20 pp 375-390 (1982), and 4) small area segmentation (see, e.g., N.H. Yeh et al, "Character Recognition by 1 Board OCR" Proceedings of International Computer Symposium, 1986, December 17-19, Tainan, Taiwan ROC, pages 129-137). These four character extraction techniques locate the character boundaries by scanning each column of pixels to identify the highest and lowest boundary of each character and scanning each line of pixels to get the left-most and right-most boundary of each character.

Each of these four techniques has its own advantages and disadvantages. The advantage of the histogram technique is high speed. However, the histogram technique cannot handle images in which the lines of text are slanted and the histogram technique cannot handle complex documents comprised of text and graphics mixed together. On the other hand, the expansion and shrinking method has the capability of processing complex images comprising graphics and text. However, this method is of low speed, requires excessive computation capacity and is sensitive to noise. Similarly, the Small Area Segmentation Method has high speed and the capability of processing slanted lines but cannot handle complex documents including mixed text and graphics.

Efforts have been made to improve these techniques. For example, ROC patent No. 30987, entitled "Block Segmentation Labeling During One Scanning" has mitigated the disadvantages of low speed and excessive use of computation capacity in the constraint run length method. However, this technique is unable to process complex images comprised of text and graphics and is sensitive to noise.

In view of the foregoing, it is an object of the present invention to provide an image processing method which can receive a digital image of a complex document and separate the digital image into areas comprising lines of text and graphics, and determine character boundaries within the lines of text. It is a further object to provide such an image processing technique which is high speed, utilizes a minimum of computation capacity, is relatively insensitive to noise, is capable of handling complex documents comprising mixtures of textual and graphical material, and is capable of processing slanted lines of text.

SUMMARY OF THE INVENTION

The present invention is an image processing method and system for processing complex documents comprising text and graphics. The inventive method makes use of a scanner for digitizing a document and a recognition engine for processing the digital representation of the document made by the scanner. In particular, the recognition engine serves to convert a digital representation of a document into symbolic information about what is contained in the document. The symbolic information is then stored in a memory associated with the recognition engine.

Illustratively, the recognition engine is implemented using a general purpose computer. The purpose of the recognition engine is to 1) identify lines of text and to separate textual areas from graphics areas, 2) to identify character boundaries in the lines of text once these lines of text are identified, and then 3) to recognize individual characters or words.

The present invention is concerned with how the recognition engine recognizes lines of text, separates text from graphics, and recognizes character boundaries within lines of text.

In accordance with the present invention, a digitized image of a document is first separated into a plurality of columns each of which is for example 32 bits (i.e. pixels) wide. Each column is then separated horizontally into a plurality of rectangularly shaped units, wherein each unit represents a portion of a line of text. This may be accomplished by first developing a horizontal histogram which shows the number of black pixels in each row of pixels in the column. The histogram indicates groups of pixel rows which contain large numbers of black pixels and groups of pixel rows which contain few or no black pixels. This information tells how a column may be separated into units with each unit comprising one group of rows with a large number of black pixels. Alternatively, instead of utilizing a horizontal histogram to perform the horizontal separation, a shadow of the column on the vertical axis may be utilized instead. There is one pixel in the shadow for each row of pixels in the column, and the value of a shadow pixel is obtained by performing a logical "OR" operation on the pixels in the corresponding row. Once the shadow is obtained, the black (i.e. logic "1") portions of the shadow define the units.

When the units of the various columns are obtained, the units may be organized into a linking list. The linking is a two-dimensional array which is comprised of the various units obtained by horizontally cutting the various columns.

The next task is to link together various units to form lines of text which may be horizontal or may in fact slant. This is accomplished by first eliminating units which are too tall or too short. For example, units which have a height which is less than three bits or three pixels are noise and may be eliminated. Units which are too tall usually form part of a graphical portion of the image rather than part of a textual portion of an image. These units may be eliminated for example by obtaining the mean unit height, multiplying by a tolerance factor such as 1.5 to obtain a threshold and eliminating all units having a height greater than a threshold. This serves for example to eliminate from the image, graphical sections as well as for example vertical lines which outline tables or charts. The remaining units are then connected into horizontal lines of text by connecting units whose horizontal histograms or shadows on the vertical axis overlap. This accounts for the possibility that lines of text are slanted.

After the lines of text are obtained, the next task is to obtain the character boundaries within each line. This is done by first projecting onto a horizontal axis located below each line a shadow of the line, i.e. a pixel in the shadow becomes a logic "1" if any pixel above it in the line of text in a logic "1". The shadow on the horizontal axis is then divided into groups of, for example, eight bits.

The binary number represented by each 8-bit group is used to index a table stored in a memory associated with the computer which implements the recognition engine. The value obtained from the memory then determines the location and nature of any character boundary in the 8-bit group.

Once the character boundaries are obtained in all the lines of text, conventional recognition algorithms may be utilized to recognize the individual characters. The resulting symbolic information is then stored in memory for further processing.

Use of the present invention to identify lines of text and character boundaries within lines has several significant advantages.

(1) high speed: present invention has a much smaller volume of data to process than conventional methods due at least in part to the use of the table checking method to identify character boundaries. Typically, the speed of extracting characters is five times the speed of conventional methods.

(2) greater tolerance of slant: The present invention shows great tolerance of slanted lines of text.

(3) greater tolerance of noise: The present invention is relatively insensitive to noise.

(4) capability for processing complex documents comprising graphical and textual regions: In particular, the use of the two dimensional linking list, shows how lines of text are linked to large graphic regions, which graphic regions are easy to delete because of their having a height greater than that of textual characters.

(5) capability for processing tables: As in the case of graphical regions, the use of the two-dimensional linking list shows how lines of text link with a table. In addition the vertical lines which define a table can be deleted.

In general, when the two dimensional linking list of the present invention is utilized, the amount of data that has to be processed to extract character boundaries is greatly reduced. For example, an A4 document ($8\frac{1}{2} \times 11$ inches) with printing of 300 dpi will have 1.2 megabytes to process by traditional methods but only 4–5 kbytes of data to process by the present invention.

BRIEF DESCRIPTION OF THE DRAWINGS

FIG. 8 shows how the individual rectangular units formed from the columns of an image are organized into a two dimensional linking list.

FIGS. 10 and 10A schematically illustrate a plurality of rectangular units which are linked horizontally.

FIG. 11 and FIG. 12 illustrate two tables stored in a memory of the system of FIG. 1.

FIG. 13 shows an entry from the table of FIG. 11 expressed in binary form.

FIG. 14 illustrates how the entry from the table of FIG. 11 indicates where the character boundaries are located.

DETAILED DESCRIPTION OF THE INVENTION

Figure 1:
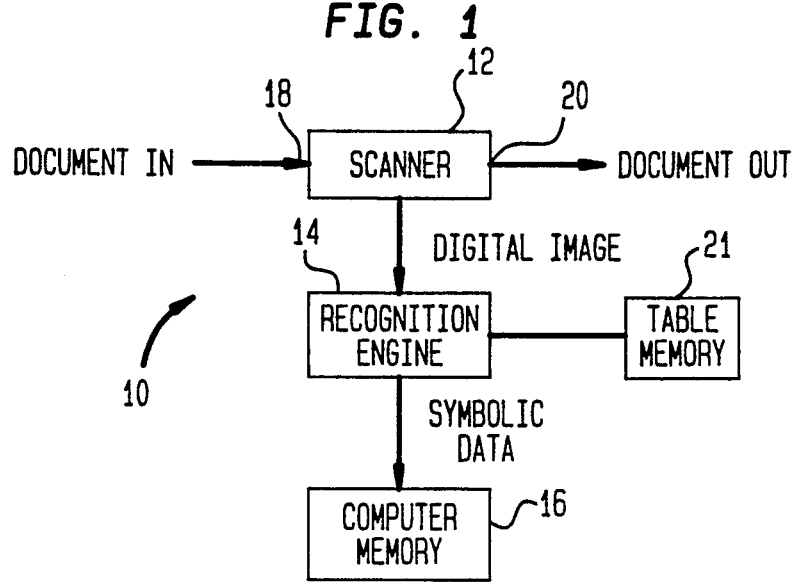
FIG. 1 schematically illustrates an optical character recognition system.

A system architecture for an optical character recognition system is illustrated in FIG. 1. The optical character recognition system 10 comprises the scanner 12, the recognition engine 14, and the computer memory 16. A document enters the scanner 12 at the document input 18 and leaves at the document output 20. The scanner 12 generates a digital image of the document by illuminating it with a light source and recording the reflected light using storage devices such as CCDs. Illustratively, the recorded digital image is bitonal, i.e. each pixel is black or white, with black corresponding to logic "1" and white corresponding to logic "0".

The digital image produced by the scanner 12 is outputted to the recognition engine 14. The recognition engine 14 may be implemented in software through use of a general purpose computer or may be implemented in hardware using electronics or optical processing elements. The purpose of the recognition engine 14 is to transform information received from the scanner in the form of a digital image into symbolic information about what symbols are contained in the image.

After the symbolic information is obtained by the recognition engine 14, it is stored in the computer memory 16.

Figure 2:
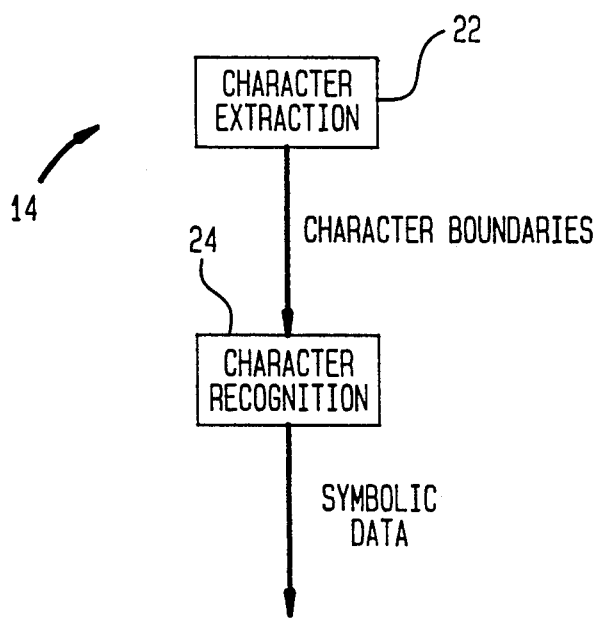
FIG. 2 schematically illustrates a recognition engine for use in the optical character recognition system of FIG. 1.

The recognition engine 14 is shown in greater detail in FIG. 2. The recognition engine 14 comprises system 22 for performing character extraction and system 24 for performing character recognition. When the recognition engine 14 is implemented using a programmable device such as a general purpose computer, the character extraction system 22 and the character recognition system 24 are implemented in software.

The purpose of the character extraction system 22 in the case of a complex document is to identify and delete graphical regions, identify lines of text in textual regions, and identify boundaries between characters in the lines of text. The purpose of the character recognition system is to identify particular words or characters in a line of text and to output symbolic information representative of these characters.

Figure 3:
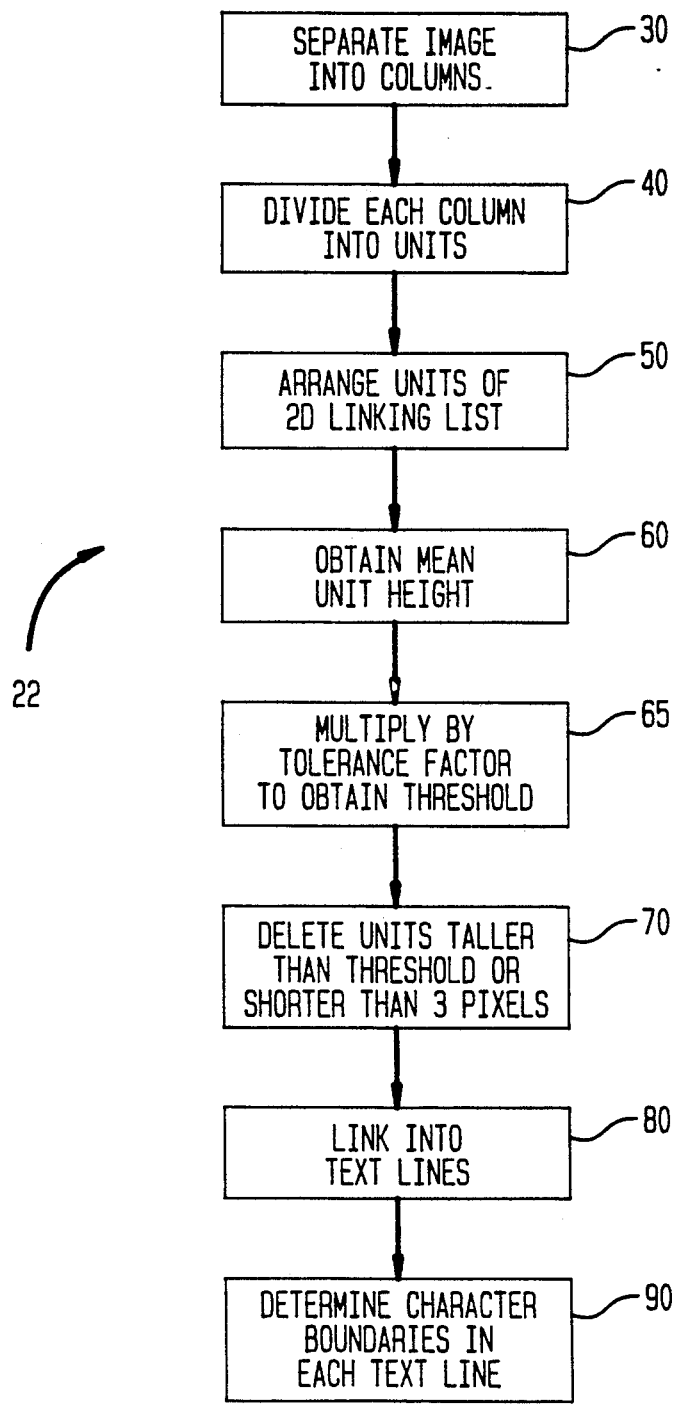
FIG. 3 and FIG .4 are flow charts which illustrate the operation of a character extraction system comprising part of the recognition engine of FIG. 2, in accordance with an illustrative embodiment of the present invention.
Figure 4:
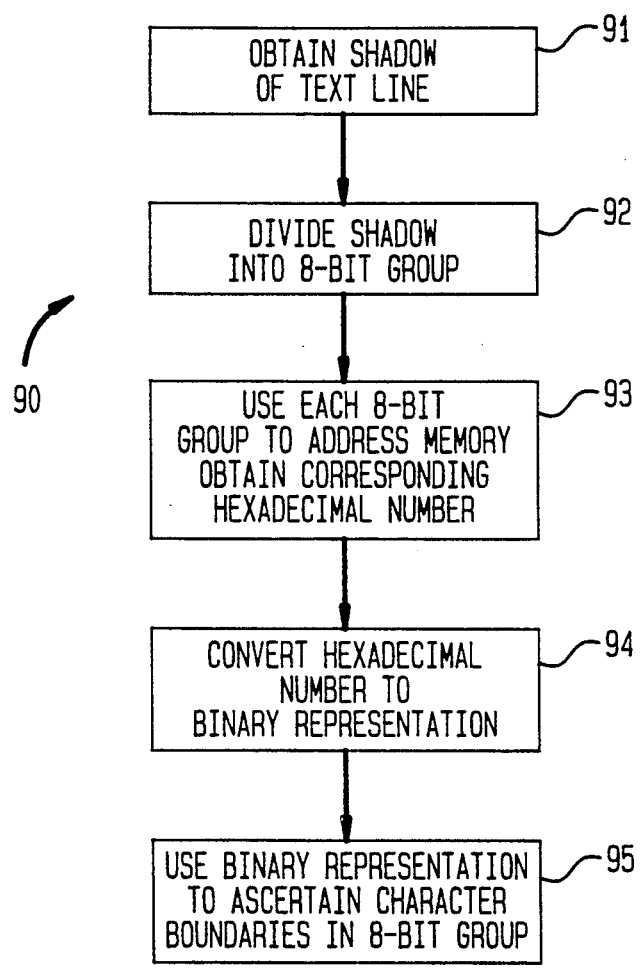
Figure 5:
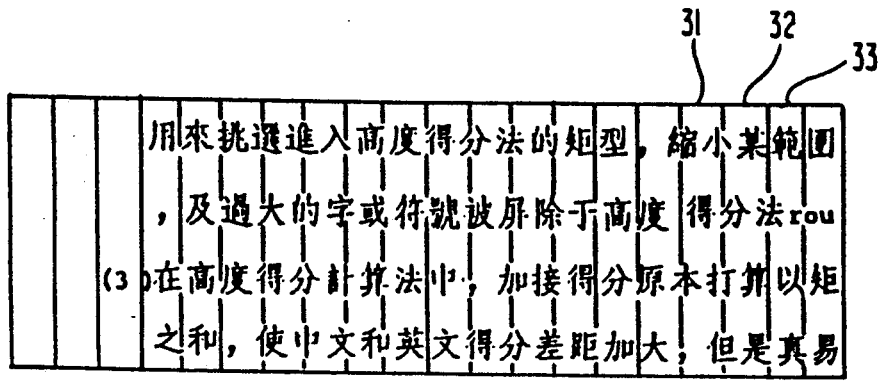
FIG. 5 shows an image of Chinese text which has been divided into columns and FIG. 6 shows one such column.
Figure 6:

A character extraction system 22 is illustrated in greater detail in FIG. 3 and in FIG. 4. The first step (box 30) performed by the character extraction system 22 is to divide the pixels of a digital image into columns which illustratively are 32 pixels (or bits) wide. FIG. 5 shows an image of Chinese text which has been divided into columns 31, 32, 33 and FIG. 6 shows one such column 35.

Figures 7, 7A:
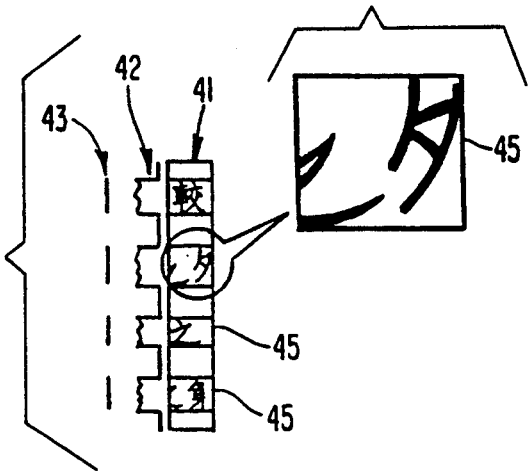
FIGS. 7 and 7A show the column of FIG. 6 after it has been separated horizontally into rectangular units.

The next step (box 40 of FIG. 3) is to separate each column horizontally into units. This is accomplished by obtaining the horizontal histogram of the column. The horizontal histogram is obtained by counting the number of black pixels in each row of pixels in the column. One column 41 and its horizontal histogram is schematically illustrated in FIGS. 7 and 7A. In FIGS. 7 and 7A, the column is labeled 41, the horizontal histogram labeled 42, and the shadow of the histogram on the vertical axis is labeled 43. By looking at the histogram or its shadow, it can be seen how the column 41 divides itself into small rectangular units 45, where each unit comprises, for example, a small unit of a line of text. In an alternative embodiment of the invention, the separation into units may be obtained, without forming the histogram 42 and by directly obtaining the shadow of the column 41 on the vertical axis.

When the units 45 are obtained, they are arranged (box 50 of FIG. 3) in a two-dimensional array or linking list illustrated in FIG. 8. The vertical arrows link the units of a column. How the units are linked horizontally is discussed below.

Figure 9:
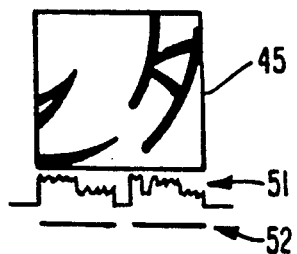
FIG. 9 schematically illustrates a rectangular unit and its associated vertical histogram and associated shadow on the horizontal axis.

For each unit in the two dimensional linking list, data is stored in memory including the unit height measured in pixels and a vertical histogram or a shadow of the unit on the horizontal axis. There is one bit in the shadow on the horizontal axis for each column of pixels in the unit and the value of the bit in the shadow is obtained by performing a logical OR operation on the pixel values in the column. FIG. 9 illustrates for a unit 45 a vertical histogram 51 and shadow 52 on the horizontal axis. The horizontal histogram and/or shadow on the vertical axis may also be stored for each unit in the computer memory.

The next step is to eliminate units which are two tall or too short. Units which are too tall usually correspond to graphics or to vertical lines bordering tables and units which are too short correspond to noise. For example, a unit which has as height less than three pixels is noise and may be eliminated. To determine which units are too tall, and thereby correspond to graphics, the mean height of the units is obtained (box 60 of FIG. 3). The mean height is multiplied by a tolerance factor such as 1.5 to obtain a threshold (box 65 of FIG. 3). Units which have a height in pixels greater than the threshold are for example deleted or in some other way identified as belonging to a graphics region of an image (box 70 of FIG. 3).

The next step is to link together the remaining units to form text lines (box 80 of FIG. 3). Adjacent units 45 are linked in the horizontal direction as shown in FIGS. 10 and 10A if their horizontal histograms (or their shadows on the vertical axis) overlap. FIG. 10 illustrates two units 45 which may be linked horizontally because their shadows on the vertical axis overlap. In this manner the units of text are connected together to form lines in a manner which takes slant into account (box 80 of FIG. 3).

Once a digital image is organized into a two dimensional linking list wherein graphic regions have been identified and separated or eliminated and wherein rectangular units of text are linked vertically and horizontally to form lines of text, the lines of text may be easily accessed for various processing tasks.

After the lines of text have been identified, the next step is to identify character boundaries within each text line (box 90 of FIG. 3).

The process (box 90) utilized by the character extraction system 22 of FIG. 2 to identify character boundaries is illustrated in greater detail in FIG. 4.

To carry out the boundary recognition process, the recognition engine 14 (see FIG. 1) makes use of the table memory 21. The table memory 21 stores two tables. The first table is illustrated in FIG. 11. The table of FIG. 11 comprises 256 hexadecimal numbers arranged in a string. The table of FIG. 12 also comprises a plurality of hexadecimal numbers arranged in a string.

As shown in the flowchart of FIG. 4, the first step utilized by the recognition engine 14 of FIG. 1 to identify character boundaries in a line of text is to obtain the shadow of the line of text on the horizontal axis (box 91 of FIG. 4). The next step is to divide the shadow into groups of 8-bits (box 92 of FIG. 4). The binary number formed by each eight-bit group is used by the recognition engine 14 of FIG. 11 to address the table stored in the table memory 21 and illustrated in FIG. 11. More particularly, the eight-bit group has a binary value $j$ (which is between 0 and 255). This binary value $j$ is used to retrieve the $j^{th}$ hexadecimal entry in the string comprising the table of FIG. 11 (box 93 of FIG. 4). This hexadecimal number is then converted to binary form (box 94 of FIG. 4) and is now represented by the binary values a, b, c, d, e, f, g, h as illustrated in FIG. 13.

The binary values a,b,c,d,e,f,g,h are utilized to determine the location of the character boundaries within the portion of the line of text corresponding to the eight bit shadow utilized to access the table of FIG. 11 (box 95 of FIG. 4).

The various possibilities for character boundaries in an eight-bit wide segment of a line of text are illustrated in FIG. 14. In case <1>a=0, b=0. If h=0, the corresponding portion of the shadow is all logic 0 and there is no character boundary in this portion of the line of text. Similarly, if a=0, b=0 and h=1, the corresponding portion of the shadow is all logic 1 and there is no character boundary in this portion of the line of text.

In case <2>, a=0 and b=1. If c=0, a character ends (i.e. there is a transition from logic 1's to logic 0's) at a position in the eight-bit group of the shadow given by f,g,h. The ending of the character is schematically illustrated by the arrow 96 in FIG. 14. If c=1, a character begins (i.e. there is a transition from logic 0's to logic 1's) at the position of the eight-bit group of the shadow given by f,g,h. The arrow 97 in FIG. 14 illustrates where the character begins.

In case <3>a=1. If b=0, there is a transition 98 in the shadow from logic 0 to logic 1 at c,d,e and a transition 99 from logic 1 to logic 0 at f,g,h. If b=1 there is a transition 101 from logic 1 to logic 0 at c,d,e and transition 102 from logic 0 to logic 1 at f,g,h.

In case <4>a=0, b=0. If cd=01, the transitions ABCD can be distributed as follows: A(0 or 1), B(2 or 3), C(4 or 5), D(6 or 7) where the number in parenthesis indicates bit positions in the original eight-bit group of the shadow of the line of text. In this case the location of the transitions A, B, C, and D are stored by the values of e,f,g,h in the binary representation of the hexadecimal number retrieved from the table of FIG. 11.

If a=0, b=0, and cd=10, then the transitions ABC may be distributed as A (0 or 1), B(2,3, or 4), C(4,5, or 6). Similarly, if a=0, b=0, and cd=11, then the transitions ABC may be distributed A(1,2, or 3), B(3,4, or 5), C(5,6, or 7). In these cases, the four bits e,f,g,h are not sufficient for recording all possible transitions A,B,C. The values e,g,f,h from the binary representation of the number retrieved from the table of FIG. 11, are then utilized as pointers to the table of FIG. 12. The table of FIG. 12 also stores a string of hexadecimal numbers. A hexadecimal number is accessed from the table of FIG. 12 in response to the binary values e,f,g,h from a number from the table of FIG. 11. When the hexedecimal number from the table of FIG. 12 is rewritten in binary form (abcdefgh) a,b determines the location of the transition A, d,e determine the location of the transition B, and g,h determine the location of the transition C. Because there are no more than three possible positions for A,B, and C no more than two bits are needed to locate these transitions.

To understand the use of the table stored in the memory 21 of FIG. 1 consider the following example. In a line of text, a byte of the shadow has the value
1 1 0 1 1 1 1 0 (binary)
This has the value j=222 (decimal) and thus is utilized to retrieve the j=222 value from the string of hexadecimal values stored in the table of FIG. 11. The j=222 value in the table of FIG. 11 is 0×29 (hexadecimal). The binary representation of this value is
a b c d e f g h
0 0 1 0 1 0 0 1
Thus a=0, b=0, cd=10. The table of FIG. 12 is now accessed using efgh=1001 (=9) to retrieve the hexadecimal value 0×4a. When converted to binary form 0×4a is
a b c d e f g h
0 1 0 0 1 0 1 0 whereby the locations of transitions A, B and C are as follows:
A=0 (decimal)+01 (binary)=1 decimal
B=2 (decimal)+01 (binary)=3 decimal
C=4 (decimal)+10 (binary)=6 decimal.

As can be seen from this example, two table accesses at most are needed to determine character boundaries, although in most case one table access will be sufficient. Thus the character boundary determination process is fast and efficient.

Finally, the above-described embodiments of the invention are intended to be illustrative only. Numerous alternative embodiments may be devised by those skilled in the art without departing from the spirit and scope of the following claims.

What is claimed is:

1. An electronic image processing system comprising
scanning means for forming a digital image representative of a document,
a recognition engine for receiving said digital image, said recognition engine comprising means for identifying lines of text in said digital image and means for identifying character boundaries in said lines of text.
said means for identifying character boundaries comprising memory means for storing at least a first table comprising memory means for storing at least a first table comprising a plurality of entries, means for forming a shadow of each line of text, means for dividing said shadow into groups of bits each of which forms an address for said memory, means for retrieving one entry from said table for each group of bits in said shadow, each retrieved entry from said table containing information for determining the location of character boundaries in a corresponding portion of a line of test,
wherein said memory stores first and second tables and wherein a group of bits from said shadow having a predetermined pattern of transitions is utilized to retrieve a first entry from said first table and the first entry retrieved from the first table is used to retrieve a second entry from the second table to identify character boundaries.

2. The system of claim 1 wherein each group comprises eight bits, and wherein if a group of bits has 0,1,2, or 4 transitions, said retrieved entry from said first table contains information indicating the location of character boundaries in a corresponding portion of a line of text and if a group of bits has 3 transitions, said entry from said first table is used to access said second table.

3. An electronic image processing method comprising
generating a digital image of a document,
receiving said digital image in a recognition engine for identifying lines of text in said image,
maintaining in a memory connected with the recognition engine a table of entries for determining character boundary information,
utilizing said recognition engine to form a shadow of each line of text,
dividing the shadow of each line of text into groups of bits,
for each group of bit sin a shadow, retrieving an entry from said memory connected to said recognition engine, said entry retrieved from said memory determining character boundary information for a corresponding portion of a line of text, wherein said method comprises the steps of
maintaining in said memory first and second tables and when a group of bits has a predetermined pattern of transitions, said retrieving step comprises utilizing said group of bits from a shadow to access to a first entry from the first table in said memory and utilizing said first entry to access a second entry from the second table in said memory, said second entry containing boundary information for a corresponding portion of a line of text.

4. The method of claim 3 wherein each group of bits has 8 bits and when a group of bits has 0,1,2 or 4 transitions, said retrieving step comprises retrieving an entry information and when a group of bits has 3 transitions, said retrieving step comprises retrieving an entry from said first table which is then utilized to retrieve an entry from said second table.

* * * * *